UNITED STATES PATENT OFFICE.

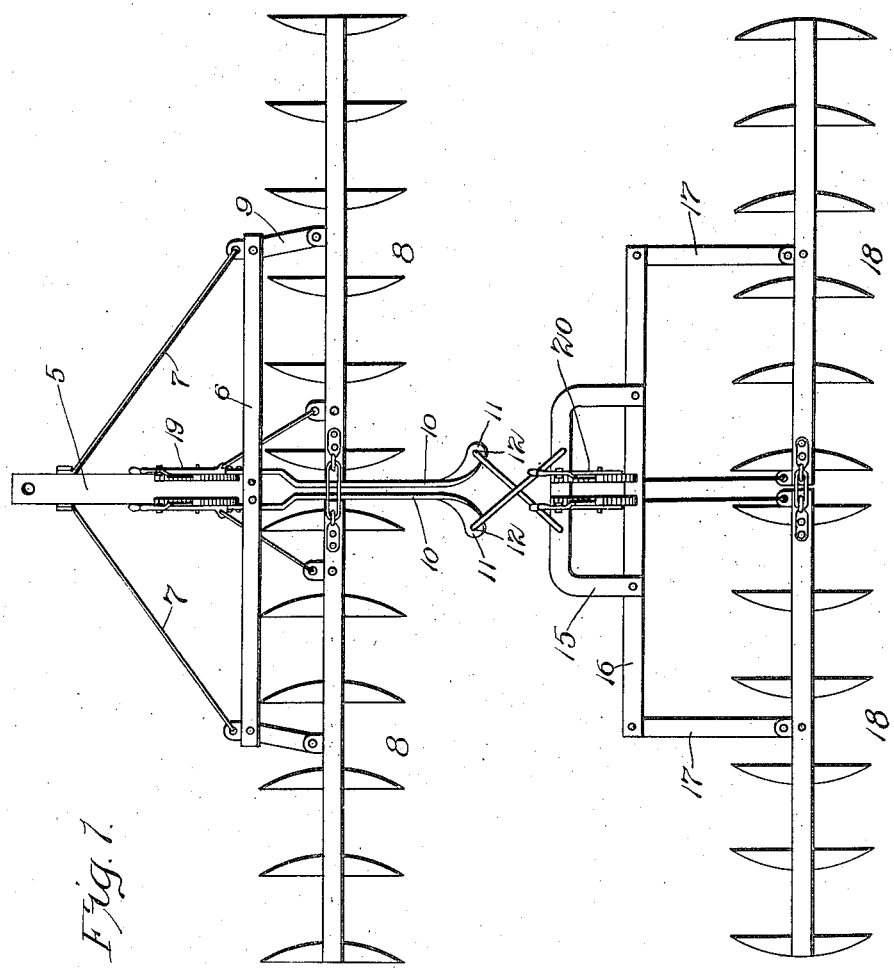

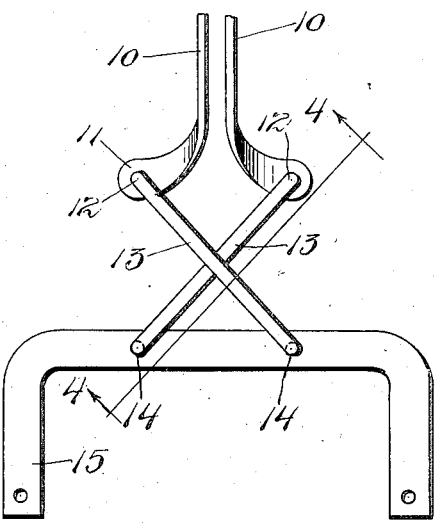
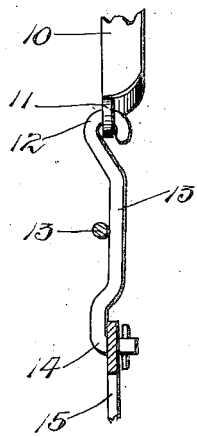
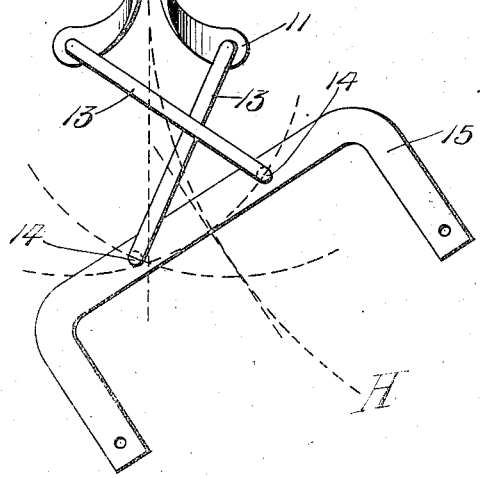

HARRY S. DICKINSON, OF MOLINE, ILLINOIS, ASSIGNOR TO MOLINE PLOW COMPANY, OF MOLINE, ILLINOIS, A CORPORATION OF ILLINOIS.

DOUBLE-CUT HARROW.

1,115,410.

Specification of Letters Patent. Patented Oct. 27, 1914.

Application filed April 9, 1914. Serial No. 830,608.

*To all whom it may concern:*

Be it known that I, HARRY S. DICKINSON, a citizen of the United States, residing at Moline, in the county of Rock Island and State of Illinois, have invented certain new and useful Improvements in Double-Cut Harrows, of which the following is a specification.

This invention has particular reference to a compensating connection between the front and rear units comprising a double cut harrow, and the object of the invention is to so construct and arrange the connection that the rear section or unit will in turning be positively held and maintained in the true line of advance of the draft animals so that the disks or other furrow openers in making the turn will travel in the true arc of a circle which is important in maintaining uniformity in the furrows and in the avoidance of uneven turning movements which tend to ditch out the ground and impose severe strains upon the implement and the draft animals or appliances.

In the case of double cut harrows, commonly in use, a single central pivotal connection is employed between the front and rear units and no means, other than the drag on the rear unit are afforded for maintaining the two units in proper relation to one another. In turning such an implement, the tendency especially in rough or hard ground, is for the front unit to initially turn to a considerable degree of angularity before any draft in the new direction is imparted to the rear unit. In fact in most cases the parts will be initially turned to a degree approaching a right angle before the continued pull of the draft animals has the effect of turning or dragging the rear unit around into the new line of advance. As soon as the pull is felt, however, the rear unit will be dragged or slued around by a lateral pull, in a direction broadside to the embedded disks with the result that a hole will be ditched in the ground and a severe and sudden strain or jerk imposed upon the single pivotal connection and upon all portions of the implement.

With the improved compensating connection, which forms the subject matter of this invention, as soon as the draft animals begin to make a turn, the lateral draft will have the effect of immediately throwing the front and rear units into an angling position with one another such that the rear unit will immediately begin to trail the front unit in the newly established line of curvature occasioned by the turning of the draft animals. This will have the effect of avoiding the imposition of sudden strains or jerks on the connection and of avoiding broadside strains against the embedded disks and will also result in the formation of a true and evenly cut furrow irrespective of the inequality or hardness of the ground. Further features will be apparent from the subsequent description of the invention which consists in the features of construction and combinations of parts hereinafter described and claimed.

In the drawings: Figure 1 is a plan view of the implement with the front and rear sections in parallel or unturned relation; Fig. 2 is an enlarged detail showing the compensating connections in normal or unturned position; Fig. 3 is a similar view showing the parts in turned position; and Fig. 4 is a detail showing one of the connecting compensating rods overlying the other.

In the drawings, the front unit comprises a draft tongue 5, to the rear end of which is secured a cross bar 6 which is braced by diagonal braces 7 of the usual type. The front section further comprises a pair of disk gangs 8—8 which are connected to the outer ends of the cross bar 6 by strap links 9. The present invention, however, is not concerned with the details of construction of either the front or rear units so that it will be understood that these parts may be changed or modified without effecting the present invention.

The draft tongue has extending rearwardly therefrom a pair of bars 10—10 which in effect constitute a portion of the front frame and afford points of attachment for the compensating connection which more particularly forms the subject matter of the invention. These bars 10—10 have their rear ends 11—11 spread or flared to afford two socket holes 12—12 into which are pivoted the forward ends of a pair of compensating connecting bars 13—13 which are arranged in X relation to one another, and overlie one another, as best shown in Fig. 4.

The compensating connecting bars are of equal length and their rear ends are pivoted in socket holes 14—14 in an arched bar 15 which extends forwardly from, and in effect forms a part, of the rear frame 16 which carries the rear harrow unit. It is important in securing the most perfect compensating action that the socket holes which receive the front and rear ends of the compensating connection bars be equally spaced in order that, in turning, the pull on one of the bars be commensurate with the thrust on the other bar as best indicated in Fig. 3. The rear frame, as shown, is provided at its end with rearward extensions 17—17 to which the rear gangs 18—18 are pivoted, although the details of construction of this portion of the implement are unimportant and may be varied without effecting the operation of the compensating connection hereinbefore described. Front levers and connections 19 are provided for angling the front pair of gangs with respect to one another, and a rear lever and connections 20 are likewise provided for angling the pair of rear gangs with respect to one another, but these details are unimportant and may be changed or modified in ways well understood in the art to meet structural requirements of various implements now in common use.

In use, with the implement advancing in a straight line, the compensating connecting bars will occupy the relative positions shown in Fig. 2, and the pull of the draft animals will serve to maintain the front and rear units in parallel relation with one another. But when the implement begins to turn the connections will be thrown into the position shown in Fig. 3. In this figure, the line A—A represents the turning line of advance and it will be noted that the longitudinal centers of both the front and rear sections are tangent to this curve. This tangential relation is established and maintained by reason of the fact that when the front unit begins to turn one of the compensating connecting bars will exert a pull on the rear unit and the companion connecting bar will exert a corresponding thrust which throw the parts to a degree of angularity with respect to one another commensurate with the line of curvature representing the turning advance of the draft animals.

In view of the fact that the center of the rear unit, at the point where the draft is applied, is held in co-incidence with the curving line representing the turning direction of the implement it must be apparent that the pull on the rear unit will always be a forward pull in the proper direction and not an objectionable lateral pull which is exerted upon the rear unit in cases where a single centrally disposed pivotal connection is relied upon to transmit the draft from the front to the rear unit as is the ordinary practice. Furthermore, the connection is one which allows sufficient flexibility to accommodate the harrow units to elevations or depressions which are frequently encountered in the plowing of rough ground, and at the same time maintain the front and rear units in the proper angularity with one another to facilitate the turning of the implement. The construction is one which possesses not only functional but also structural advantages in that it permits the use of two connections instead of one, thereby dividing the strains incident to use while at the same time minimizing the strains and shocks by reason of the superior functioning of the parts in automatically adjusting the harrow units to meet the requirements of actual operation.

While the connection to which the present invention particularly relates will serve especially the function of guiding and directing the second unit of harrows when taking curves, still I wish to point out the fact that it will also serve to assist in keeping the harrows in proper relation during normal progress of the implement.

I claim:

1. In combination with front and rear harrow units employing disks, a compensating connection in form to automatically angle the units to a degree commensurate with changes in the direction of advance of the implement.

2. In combination with front and rear harrow units employing disks, compensating connecting bars pivoted to the front and rear units respectively in a manner to automatically angle the units to a degree commensurate with the changes in the direction of advance of the implement.

3. In combination with front and rear harrow units employing disks, compensating connecting bars crossing one another and pivoted to the front and rear units respectively in a manner to automatically angle the units to a degree commensurate with the changes in the direction of advance of the implement.

4. In combination with front and rear harrow units comprising each a frame and disk furrow openers carried thereby, a compensating connection consisting of crossed bars pivoted at their front ends to the front unit and at their rear ends to the rear unit and adapted to automatically angle the front and rear units to a degree commensurate with changes in the direction of the advance of the implement.

5. In combination with front and rear harrow units, the front unit comprising a tongue and frame and disks carried thereby, and the rear unit comprising a frame and disks carried thereby, the front unit having an extension projecting rearwardly from the tongue and provided at its rear end with spaced socket holes, a portion of the rear frame being provided with similarly spaced socket holes and crossed compensating connecting bars having their front and rear ends pivoted respectively in the front and rear socket holes and adapted to automatically angle the front and rear units to a degree commensurate with changes in the direction of the advance of the implement.

HARRY S. DICKINSON.

Witnesses:
L. C. BLANDING,
J. J. LAMB.